(12) United States Patent
Chew et al.

(10) Patent No.: US 12,539,566 B2
(45) Date of Patent: Feb. 3, 2026

(54) SINTERING PASTE AND USE THEREOF FOR CONNECTING COMPONENTS

(71) Applicant: Heraeus Deutschland GmbH & Co. KG, Hanau (DE)

(72) Inventors: Ly May Chew, Hanau (DE); Wolfgang Schmitt, Hanau (DE); Michael Schäfer, Hanau (DE)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 371 days.

(21) Appl. No.: 18/257,037

(22) PCT Filed: Jul. 22, 2021

(86) PCT No.: PCT/EP2021/070543
§ 371 (c)(1),
(2) Date: Jun. 12, 2023

(87) PCT Pub. No.: WO2022/128177
PCT Pub. Date: Jun. 23, 2022

(65) Prior Publication Data
US 2024/0033860 A1     Feb. 1, 2024

(30) Foreign Application Priority Data
Dec. 16, 2020 (EP) .................... 20214425

(51) Int. Cl.
| B23K 35/02 | (2006.01) |
| B23K 35/30 | (2006.01) |
| B23K 35/36 | (2006.01) |
| B23K 103/10 | (2006.01) |

(52) U.S. Cl.
CPC ........ *B23K 35/025* (2013.01); *B23K 35/3006* (2013.01); *B23K 35/3613* (2013.01); *B23K 2103/10* (2018.08)

(58) Field of Classification Search
None
See application file for complete search history.

(56) References Cited

U.S. PATENT DOCUMENTS

| 8,497,022 | B2* | 7/2013 | Komatsu | B23K 35/3006 428/407 |
| 10,144,095 | B2* | 12/2018 | Schäfer | H05K 1/11 |
| 10,328,534 | B2* | 6/2019 | Endoh | B23K 35/3006 |
| 10,446,518 | B2* | 10/2019 | Inoue | B22F 7/04 |
| 10,910,340 | B1* | 2/2021 | Chew | H01L 24/29 |
| 11,804,313 | B2* | 10/2023 | Fujii | B22F 1/107 |
| 11,938,543 | B2* | 3/2024 | Chew | B22F 7/04 |
| 2017/0283624 | A1* | 10/2017 | Kunimune | B22F 1/107 |
| 2021/0024766 | A1* | 1/2021 | Chou | C09D 11/10 |

FOREIGN PATENT DOCUMENTS

| CN | 109616242 B | 7/2020 |
| EP | 2792642 A1 | 10/2014 |
| JP | 2010109334 A | 5/2010 |

OTHER PUBLICATIONS

Lee H-H et al. "Effect of nano-sized silver particles on the resistivity of polymeric conductive adhesives" International Journal of Adhesion and Adhesives, Elsevier, Amsterdam, NL, vol. 25, No. 5, Oct. 1, 2005 (Oct. 1, 2005), pp. 437-441, [retrieved on Oct. 1, 2005] ISSN: 0143-7496, XP02776 8588; paragraphs 2.1, 2.2, 3.1 and 3.2; p. 438-p. 440 table 1 figures 1-3.

Renliang Xu et al. "Comparison of sizing small particles using different technologies" Powder Technology, Elsevier, Basel (CH), vol. 132, No. 2-3, Jun. 24, 2003 (Jun. 24, 2003), pp. 145-153 DOI: 10.1016/S0032-5910(03)00048-2 ISSN: 0032-5910, XP002711749; abstract figure 1 table 6 paragraph 4; p. 152.

Malvern. "A basic guide to particle characterization" Dec. 31, 2015 (Dec. 31, 2015), Retrieved from the Internet: https://www.cif.iastate.edu/sites/default/files/uploads/Other_Inst/Particle%20Size/Particle%20Characterization%20Guide.pdf [retrieved on Mar. 1, 2021] XP055780752 p. 5; figure 3.

Chee Sang-Soo et al. "Reduction synthesis of silver nanoparticles anchored on silver micro-flakes and electrical resistivity of isotropic conductive adhesives at percolation threshold" Electronic Materials Letters, Daehan Geumsog Jae'Lyo Haghoe, KR, vol. 8, No. 3, Jun. 15, 2012 (Jun. 15, 2012), pp. 315-320, [retrieved on Jun. 15, 2012] DOI: 10.1007/SI 3391-012-1105-3 ISSN: 1738-8090, XP036414988 abstract.

\* cited by examiner

*Primary Examiner* — Devang R Patel
(74) *Attorney, Agent, or Firm* — Blank Rome LLP

(57) ABSTRACT

The invention relates to a sintering paste consisting of: (A) 30 to 40 wt. % of silver flakes with an average particle size ranging from 1 to 20 μm, (B) 8 to 20 wt. % of silver particles with an average particle size ranging from 20 to 100 nm, (C) 30 to 45 wt. % of silver(I) oxide particles, (D) 12 to 20 wt. % of at least one organic solvent, (E) 0 to 1 wt. % of at least one polymer binder, and (F) 0 to 0.5 wt. % of at least one additive differing from constituents (A) to (E).

19 Claims, No Drawings

SINTERING PASTE AND USE THEREOF FOR CONNECTING COMPONENTS

The present invention relates to a sintering paste and to a method for connecting components in which said sintering paste is used.

As explained below, sintering pastes are products that are not to be confused with conductive adhesives. It is true that conductive adhesives can also be used to connect components, with mechanically strong and electrically conductive connections being produced; however, because they have a comparatively low metal content, the connections are naturally not as thermally conductive as connections produced from sintering pastes.

The term "component" used herein refers in particular to component parts used in electronics, in short to electronic components. Examples of these include diodes, LEDs (light-emitting diodes), dies, IGBTs (insulated-gate bipolar transistors), MOSFETs (metal oxide semiconductor field effect transistors), ICs (integrated circuits), sensors, heat sinks, resistors, capacitors, coils, connecting elements (e.g., clips), base plates, antennas, lead frames, PCBs (printed circuit boards), flexible electronics, ceramic substrates, metal-ceramic substrates, such as DCB substrates (direct copper bonded substrates), IMS (insulated metal substrate), and the like.

The sintering connection of electronic components is common practice in the field of power and consumer electronics. Metal sintering pastes of which the main constituents are dispersed sinterable metal particles are frequently used as the connection material. Prominent examples of such sintering pastes include silver sintering pastes known to a person skilled in the art. The sintering connection technique represents a very simple method for the stable connection of components, wherein the components to be connected are transferred with their contact surfaces to be connected facing one another to a sandwich arrangement with sintering connection material, for example sintering paste, applied therebetween. The sandwich arrangement created using sintering paste is subsequently subjected to a drying and sintering step, in the course of which the mechanically strong, electrically and thermally conductive connection between the components is formed. The mechanically strong connection of two components is therefore a fastening of one component to or on the second component via the respective contact surfaces thereof.

The object of the invention was to provide a sintering paste that is improved in particular with regard to its drying properties. In particular, the sintering paste to be disclosed should allow the formation of sintering connections between components that comprise no drying-related defects or at least acceptable (tolerably minor) drying-related defects in the layer that is applied from the sintering paste and dried and that connects the components. Drying-related defects are in particular what are referred to as drying channels. Such defects cannot only weaken the mechanical strength of the final sintering connections, but also cause a reduction in thermal conductivity and electrical conductivity.

Surprisingly, the object can be achieved by providing a sintering paste consisting of:

(A) 30 to 40 wt. % (% by weight) of silver flakes with an average particle size ranging from 1 to 20 μm,
(B) 8 to 20 wt. % of silver particles with an average particle size ranging from 20 to 100 nm,
(C) 30 to 45 wt. % of silver(I) oxide particles,
(D) 12 to 20 wt. % of at least one organic solvent,
(E) 0 to 1 wt. % of at least one polymer binder, and
(F) 0 to 0.5 wt. % of at least one additive differing from constituents (A) to (E).

The term "average particle size" used herein in connection with the silver flakes (A) means the volume-average primary particle diameter (D50) that can be determined by means of static automated analysis of microscopic images. What is known as Equivalent Circular Area Diameter (ECAD) can advantageously be used as a measure of the particle diameter (cf. RENLIANG XU ET AL: "Comparison of sizing small particles using different technologies," POWDER TECHNOLOGY, ELSEVIER, BASEL (CH), vol. 132, no. 2-3, Jun. 24, 2003 (2003-06-24), pages 145-153). The static automated analysis of the microscopic images can be carried out, for example, using the Morphologi 4 measuring system from Malvern Instruments according to the dry determination method.

The term "average particle size" used herein in connection with the silver particles (B) means the volume-average primary particle diameter (D50) that can be determined by means of laser diffraction. What is known as Equivalent Circular Area Diameter (ECAD) can advantageously be used as a measure of the particle diameter (cf. RENLIANG XU ET AL: "Comparison of sizing small particles using different technologies," POWDER TECHNOLOGY, ELSEVIER, BASEL (CH), vol. 132, no. 2-3, Jun. 24, 2003 (2003-06-24), pages 145-153). Laser diffraction measurements can be carried out using a corresponding particle size measuring instrument, for example a Mastersizer 3000 or Mastersizer 2000 from Malvern Instruments according to the wet determination method. In the wet determination method, for example, 1 g of silver particles (B) can be dispersed in 200 ml of ethanol by means of ultrasound as part of the sample preparation.

The sintering paste according to the invention contains, as constituent (A), 30 to 40 wt. %, preferably 32 to 37 wt. %, of silver flakes with an average particle size ranging from 1 to 20 μm, preferably 1 to 10 μm. The aspect ratio of the silver flakes can, for example, be >5:1 to several hundred: 1.

The aspect ratio of particles describes the quotient of the largest and smallest linear expansions of the same and thus the shape thereof; only to avoid misunderstandings, in the case of particles in the form of flakes, the quotient of the largest and smallest linear expansions is the quotient of the largest length extension and the flake thickness. This can be determined using scanning electron microscopy and by evaluating the electron microscopic images by determining the dimensions of a statistically significant number of individual particles.

The silver flakes are usually coated. The weight specifications given here then include the weight of the coating on the silver flakes.

The silver flakes can comprise flakes of pure silver (purity of the silver of at least 99.9 wt. %) and/or of silver alloys with up to 10 wt. % of at least one other alloy metal. Examples of suitable alloy metals are copper, gold, nickel, palladium, platinum and aluminum. Silver flakes of pure silver are preferred.

The above-mentioned coating can be a firmly adhering layer on the surface of the silver flakes. Typically, this is an organic coating. The proportion of the organic coating can be, for example, in the range from 0.5 to 1.5 wt. %, based on silver or silver alloy. In general, such an organic coating can comprise 90 to 100 wt. % of one or more fatty acids and/or fatty acid derivatives. Examples of fatty acid derivatives include in particular fatty acid salts and fatty acid esters. Examples of fatty acids include caprylic acid (octanoic acid), capric acid (decanoic acid), lauric acid (dodecanoic acid), myristic acid (tetradecanoic acid), palmitic acid (hexadecanoic acid), margaric acid (heptadecanoic acid), stearic acid (octadecanoic acid), oleic acid (9-octadecenoic acid), arachidic acid (eicosanoic acid/icosanoic acid), behenic acid (docosanoic acid), lignoceric acid (tetracosanoic acid).

The silver flakes are commercially available. Examples include UA8320, P6908 from Metalor, SF30L from Ames Goldsmith, and the products Silflake 40-592 and Silflake 40-50 from Technic.

The sintering paste according to the invention contains, as constituent (B), 8 to 20 wt. %, preferably 10 to 16 wt. %, of silver particles with an average particle size ranging from 20 to 100 nm.

The silver particles are usually coated. The weight specifications given here then include the weight of the coating on the silver particles.

The silver particles are not silver flakes; their aspect ratio is significantly smaller than that of flakes, for example ranging from 1:1 to 5:1. Ideal spherical particles have an aspect ratio of 1:1. The aspect ratio of the silver particles ranging from 1:1 to 5:1 means that the silver particles have, for example, a spherical, substantially spherical, elliptical, egg-shaped or irregular shape, but in no way the shape of flakes.

The silver particles can comprise particles of pure silver (purity of the silver of at least 99.9 wt. %) and/or of silver alloys with up to 10 wt. % of at least one other alloy metal. Examples of suitable alloy metals are copper, gold, nickel, palladium, platinum and aluminum. Silver particles of pure silver are preferred.

The above-mentioned coating can be a firmly adhering layer on the surface of the silver particles. Typically, this is an organic coating. The proportion of the organic coating can be, for example, in the range from 0.5 to 1.5 wt. %, based on silver or silver alloy. In general, such an organic coating can comprise 90 to 100 wt. % of one or more fatty acids and/or fatty acid derivatives. Examples of fatty acid derivatives include in particular fatty acid salts and fatty acid esters. Examples of fatty acids include caprylic acid (octanoic acid), capric acid (decanoic acid), lauric acid (dodecanoic acid), myristic acid (tetradecanoic acid), palmitic acid (hexadecanoic acid), margaric acid (heptadecanoic acid), stearic acid (octadecanoic acid), oleic acid (9-octadecenoic acid), arachidic acid (eicosanoic acid/icosanoic acid), behenic acid (docosanoic acid), lignoceric acid (tetracosanoic acid).

The silver particles are commercially available. Examples include 18060-NM2 from Ames Goldsmith and the products SIL 41-193, SIL 40-277, SIL 40-147 and SIL 40-050-0720-2 from Technic.

At least a portion of the silver particles can be adhered to at least a portion of the silver flakes.

The sintering paste according to the invention contains, as constituent (C), 30 to 45 wt. %, preferably 32 to 40 wt. %, of silver(I) oxide particles. The silver(I) oxide particles serve as a silver precursor from which metallic silver can be formed by means of thermal decomposition.

The silver(I) oxide particles can have an average particle size, for example, ranging from 0.4 to 4 µm.

The term "average particle size" used herein in connection with the silver(I) oxide particles (C) means the volume-average primary particle diameter (D50) that can be determined by means of laser diffraction. What is known as Equivalent Circular Area Diameter (ECAD) can advantageously be used as a measure of the particle diameter (cf. RENLIANG XU ET AL: "Comparison of sizing small particles using different technologies," POWDER TECHNOLOGY, ELSEVIER, BASEL (CH), vol. 132, no. 2-3, Jun. 24, 2003 (2003-06-24), pages 145-153). Laser diffraction measurements can be carried out using a corresponding particle size measuring instrument, for example a Mastersizer 3000 or Mastersizer 2000 from Malvern Instruments according to the wet determination method. In the wet determination method, for example, 1 g of silver(I) oxide particles (C) can be dispersed in 200 ml of ethanol by means of ultrasound as part of the sample preparation.

The silver(I) oxide particles can be coated. The silver(I) oxide particles are preferably uncoated.

In the case of coated silver(I) oxide particles, the weight specifications given here include the weight of the coating on the silver(I) oxide particles. The coating can be a firmly adhering layer on the surface of the silver(I) oxide particles. Typically, this is an organic coating. The proportion of the organic coating can be, for example, in the range from 0.5 to 1.5 wt. %, based on the silver(I) oxide. In general, such an organic coating can comprise 90 to 100 wt. % of one or more fatty acids and/or fatty acid derivatives. Examples of fatty acid derivatives include in particular fatty acid salts and fatty acid esters. Examples of fatty acids include caprylic acid (octanoic acid), capric acid (decanoic acid), lauric acid (dodecanoic acid), myristic acid (tetradecanoic acid), palmitic acid (hexadecanoic acid), margaric acid (heptadecanoic acid), stearic acid (octadecanoic acid), oleic acid (9-octadecenoic acid), arachidic acid (eicosanoic acid/icosanoic acid), behenic acid (docosanoic acid), lignoceric acid (tetracosanoic acid).

The sintering paste according to the invention contains, as constituent (D), 12 to 20 wt. %, preferably 14 to 16 wt. %, of at least one organic solvent. Examples of suitable organic solvents include terpineols, N-methyl-2-pyrrolidone, ethylene glycol, dimethylacetamide, 1-tridecanol, 2-tridecanol, 3-tridecanol, 4-tridecanol, 5-tridecanol, 6-tridecanol, isotridecanol, dibasic esters (preferably dimethyl esters of glutaric, adipic or succinic acid or mixtures thereof), glycerol, diethylene glycol, triethylene glycol and aliphatic, in particular saturated aliphatic, hydrocarbons having 5 to 32 C atoms, more preferably 10 to 25 C atoms and even more preferably 16 to 20 C atoms. Such aliphatic hydrocarbons are, for example, sold by Exxon Mobil under the Exxsol™ D140 brand or under the Isopar M™ brand. Combinations of at least one terpineol with at least one dibasic ester are particularly preferred as constituent (D).

The sintering paste according to the invention can contain, as constituent (E), 0 to 1 wt. %, preferably 0.1 to 0.7 wt. %, of at least one polymer binder. The at least one polymer binder comprises neither self-crosslinkable polymers nor covalently crosslinkable binders/curing agent combinations. Examples of suitable polymer binders include in particular cellulose derivatives, for example methyl cellulose, ethyl cellulose, ethylmethyl cellulose, carboxycellulose, hydroxypropyl cellulose, hydroxyethyl cellulose, hydroxymethyl cellulose.

The sintering paste according to the invention can contain, as constituent (F), 0 to 0.5 wt. %, preferably 0 to 0.3 wt. %, of at least one additive differing from components (A) to (E). Examples include surfactants, defoamers, wetting agents and anti-corrosion additives. Constituent (F) preferably does not comprise any glass particles (glass frit).

The sintering paste according to the invention is a silver sintering paste.

The sum total of the percentages by weight of constituents (A) to (F) is 100 wt. %, based on the sintering paste according to the invention, i.e., before it is applied. Accordingly, the sintering paste according to the invention can be produced by mixing constituents (A) to (D) and optionally (E) and optionally (F). In this case, conventional devices known to a person skilled in the art can be used, for example stirrers, three-roll mills, guided jet mixers and/or dispersion mixers. It may be expedient to first premix the silver flakes and the silver particles with one another, for example by means of a paddle stirrer, ball mill, tumble mixer or gas jet mixer. Such premixing of the silver flakes and the silver particles allows at least a portion of the silver particles to be adhered to at least a portion of the silver flakes. The adhesion of the silver particles to the silver flakes can be ascertained after the premixing by determining the particle size distribution. The previously mentioned laser diffraction measurement can be used as a determination method. Before premixing, a bimodal particle size distribution is initially observed, which, as the premixing progresses, shifts more and more toward a monomodal particle size distribution. After the premixing is virtually complete, a substantially or completely monomodal particle size distribution is observed as the final state. In this context, "substantially monomodal" means that at least one of a plurality of peaks of a particle size distribution curve makes up at least 90% of the area under the particle size distribution curve. The adhesion of the silver particles to the silver flakes can prevent or inhibit agglomeration in the sintering paste according to the invention; it can thus promote or effect a homogeneous distribution of both the silver particles and the silver flakes in the sintering paste according to the invention.

The sintering paste according to the invention can be used in a sintering method, for example in a sintering method as explained above. Sintering is understood to mean connecting two or more components by heating while preventing the silver flakes and the silver particles from reaching the liquid phase. The solid mechanical connection formed thereby is at the same time electrically and thermally conductive; it comprises 95 wt. %, for example 95 to 100 wt. %, of silver, and is therefore not comparable to a connection between such components produced from a conventional silver conductive adhesive. A connection produced from a conventional silver conductive adhesive usually has a silver content of 90 wt. %, for example in the range from 40 to 90 wt. %, wherein a polymer proportion is usually contained and a filler proportion may be contained to make up to 100 wt. %. In this respect, the invention also relates to a method for connecting components, in which (1) a sandwich arrangement is provided which comprises at least two components and a sintering paste according to the invention located between the components, (2) the sintering paste is optionally but preferably dried and (3) the sandwich arrangement is sintered. Drying is understood to mean the removal of organic solvent from the applied sintering paste according to the invention. Steps (1), (2) and (3) form a sequence of steps of the type (1)-(2)-(3) with step (2) as an optional step. In one embodiment of the method, step (1) can already comprise drying and step (2) can thus be omitted. In another embodiment, step (1) does not comprise or only partially comprises the drying and the optional step (2) can be omitted or preferably carried out. If step (2) is omitted here, it can be carried out in the course of step (3) or can overlap said step.

The components can comprise at least one metal contact surface, for example in the form of a metallization layer, if they do not already consist of metal, via which at least one metal contact surface the aforementioned sandwich arrangement is made within the scope of the method according to the invention. Even components made of aluminum, aluminum alloys (aluminum content >90 wt. %) or with an aluminum contact surface or aluminum-based contact surface each with the strong thermal expansion behavior for aluminum can be used successfully in the context of the method according to the invention. In other words, they can be successfully sintered with the sintering paste according to the invention.

In step (1), the two or more components are first brought into contact with one another. The contacting is effected via the sintering paste according to the invention. For this purpose, a sandwich arrangement is provided in which the sintering paste according to the invention is located between two of the at least two components. The term "sandwich arrangement" means an arrangement in which two components are located one above the other and the components are arranged substantially in parallel with one another.

The sandwich arrangement can be produced according to a method known from the prior art. In this case, the relevant metal contact surface of one of the components is provided with the sintering paste according to the invention. Subsequently, the other component is placed with its metal contact surface on the sintering paste which has been applied to the metal contact surface of the first component and possibly also already dried.

The application of the sintering paste according to the invention to the relevant metal contact surface of one component can take place by means of conventional methods, for example by means of printing methods such as screen printing or stencil printing. On the other hand, the sintering paste according to the invention can also be applied by means of dispensing technology, jetting, by means of pin transfer or by dipping. The sintering paste according to the invention is particularly suitable for application by means of an application technique in which repeated shear loading is applied to the sintering paste. For example, during application by means of dispensing technology, such repeated shear loading can occur due to repeated pressure changes in the sintering paste storage container. The sintering paste according to the invention exhibits thixotropic behavior and in each case returns remarkably quickly to close to or completely to the initial viscosity when shear loading decreases or if there is no shear loading (at rest). The viscosity behavior can be investigated, for example, by means of rotational viscometry, for example at 20° C. using the plate-and-cone measuring principle at a cone diameter of 25 mm and a cone angle of 2° with a measuring gap of 0.05 mm and, for example, with a shear rate that increases uniformly over the range from 0.05 to 30 s$^{-1}$ within 15 minutes. What is known as the recovery rate after shear loading can be determined, for example, as explained in Example 2.2 below.

The wet film thickness of the sintering paste is preferably in the range from 20 to 400 µm. The preferred wet film thickness is, for example, dependent on the selected application method for the sintering paste. If the sintering paste is applied, for example, by means of screen printing methods, a wet film thickness of, for example, 20 to 60 µm may be preferred. If the sintering paste is applied, for example, by means of stencil printing, the preferred wet film thickness can be in the range from 20 to 400 µm, for example. For example, in the case of dispensing technology, the preferred wet film thickness can be, for example, in the range from 20 to 400 µm, depending on the application tool used, for example when using a hollow needle in the range from 20 to 100 µm or, for example, when using a wide-slot nozzle acting simultaneously as a doctor blade in the range from 50 to 400 µm.

Following the application of the sintering paste according to the invention to the metal contact surface of one component, the metal contact surface of said component which is provided with the sintering paste that is optionally already partially or completely dried is brought into contact with the corresponding metal contact surface of the component to be connected thereto by means of the sintering paste. Thus, a layer of sintering paste according to the invention, which is not dried, partially dried or completely dried, is located between the components to be connected with a view to forming the sandwich arrangement.

According to a preferred embodiment, the proportion of organic solvent in the sintering paste after drying is, for example, 0 to 5 wt. % based on the original proportion of organic solvent in the sintering paste according to the invention. In other words, during the drying according to this preferred embodiment, for example, 95 to 100 wt. % of the organic solvent or the organic solvents originally contained in the sintering paste according to the invention is removed.

The drying temperature in step (2) if carried out is preferably in the range from 100 to 150° C. Typical drying times are, for example, in the range from 5 to 45 minutes. To help shorten the drying time, a vacuum can be used, for example a pressure in the range from 100 to 300 mbar.

The sintering paste according to the invention is characterized in that the formation of what are known as drying channels within the layer of sintering paste located between the components can be largely or even completely avoided. This is surprising in that it would have been expected that the comparatively small silver particles (B) fill the cavities between the larger silver flakes (A) within the layer of sintering paste. In the case of such an expected denser arrangement of silver flakes (A) and silver particles (B), however, it should be more difficult for the organic solvent to escape, such that an increased formation of drying-related defects and drying channels would have been expected.

The tendency to form drying channels can be tested experimentally by a person skilled in the art by performing the above-mentioned steps (1) and (2) and using a glass plate or a ceramic plate instead of the second component. A ceramic substrate, for example, can be used as the first component. During or after completion of the drying according to step (2), said person can observe or visually evaluate to what extent drying-related defects or drying channels form in the sintering paste layer, while volatile organic solvent leaves the sintering paste layer of the sandwich arrangement at the edge. The sintering paste according to the invention is characterized by a favorable drying behavior with little or no tendency to form drying channels. The drying behavior can, for example, be evaluated as described in Example 2.1 below.

After the completion of step (1) or step (2), the sandwich arrangement is finally subjected to a sintering process. This sintering step (3) of the method according to the invention can be carried out under pressure or in an unpressurized manner. Carrying out the method in an unpressurized manner means that, despite the absence of mechanical pressure, a sufficiently firm connection can be achieved between components.

The actual sintering takes place at a temperature of, for example, 200 to 280° C. and, as stated, either as an unpressurized process or as pressure sintering.

In the case of pressure sintering, the process pressure is preferably below 30 MPa and more preferably below 15 MPa. For example, the process pressure is in the range from 1 to 30 MPa and more preferably in the range from 5 to 15 MPa.

The sintering time is, for example, in the range from 2 to 90 minutes during pressure sintering, for example in the range from 2 to 5 minutes, and, for example, in the range from 30 to 75 minutes during unpressurized sintering.

The sintering process can take place in an atmosphere that is not subject to any particular restrictions. Thus, the sintering can be carried out on the one hand in an atmosphere containing oxygen. On the other hand, it is also possible to carry out the sintering in an oxygen-free atmosphere or in a vacuum. In the context of the invention, an oxygen-free atmosphere is understood to mean an atmosphere of which the oxygen content is no more than 300 ppm by weight, preferably no more than 100 ppm by weight and even more preferably no more than ppm by weight.

The sintering is carried out in a conventional device suitable for sintering, in which the above-described process parameters can be set.

EXAMPLES

1. Production of Sintering Pastes:

The compositions of the sintering pastes 1, 2 and 3 according to the invention and of the comparative pastes C1, C2 and C3 in percent by weight are listed in Table 1.

In the case of sintering paste 1, the silver flakes and the silver particles were premixed in a tumbling mixer for 120 min and then added to the further paste constituents listed in Table 1. By contrast, the silver flakes and the silver particles were not premixed in sintering pastes 2 and 3 as well as in comparative pastes C1, C2 and C3, but were instead added directly to the further paste constituents.

TABLE 1

Composition of sintering pastes 1, 2 and 3 according to the invention and of comparative pastes C1, C2 and C3

|  | 1 | 2 | 3 | C1 | C2 | C3 |
| --- | --- | --- | --- | --- | --- | --- |
| Silver flakes* | 36.4 | 32.9 | 30.5 | 52.0 | 58.8 | 15.6 |
| Silver particles** | 15.6 | 14.1 | 9.0 |  | 25.2 | 32.4 |
| Silver(I) oxide*** | 32.0 | 37.0 | 44.5 | 32.0 |  | 32.0 |
| Ethyl cellulose | 0.3 | 0.3 | 0.3 | 0.3 | 0.3 | 0.3 |
| Terpineol | 7.85 | 7.85 | 7.85 | 7.85 | 7.85 | 9.85 |
| Dimethyl succinate | 7.85 | 7.85 | 7.85 | 7.85 | 7.85 | 9.85 |

*Silver flakes: D50: 3 µm, coated with 0.7 wt. % of a 1:1 mixture of stearic acid and lauric acid
**silver particles: D50: 50 nm, coated with 1.5 wt. % of oleic acid
***silver(I) oxide: D50: 1.7 µm, uncoated 2. Evaluation of the Sintering Pastes:

The sintering pastes 1, 2 and 3 according to the invention and the comparative pastes C1, C2 and C3 were investigated with regard to their drying behavior, their recovery capacity after shear loading and their sintering capacity on aluminum and copper surfaces.

2.1. Evaluating the Drying Behavior:

To evaluate the drying behavior, the pastes were each first applied in the shape of a square (5 cm×5 cm) and with a wet film thickness of 300 µm to the surface of an aluminum sheet by means of stencil printing. Subsequently, the surfaces of the wet non-dried pastes were each completely covered with a 1 mm thick glass platelet, such that only the outer edges of the pastes were exposed. These test structures were then placed on a heating plate and the paste layers covered with the glass platelets were dried at 130° C. for 15 min. The formation of any drying channels or defects was investigated with the aid of an optical microscope and assessed as indicated in Table 2.

2.2. Evaluation of the Recovery Rate after Shear Loading:

The recovery rate after shear loading was determined for the various sintering pastes by means of rotational viscometry using the plate-and-cone measuring principle at a cone diameter of 25 mm and a cone angle of 2° with a measuring gap of 0.05 mm at a variable shear rate. For this purpose, a measurement run was selected at which an abrupt change to a high shear rate of 100 s$^{-1}$ lasting for 30 seconds took place starting with a low shear rate of 30 s$^{-1}$ lasting for 30 seconds. This measurement run was repeated a total of twelve times. The recovery rate was determined as a percentage change in the final viscosity compared with the initial viscosity [(quotient of final viscosity and initial viscosity)×100%]. The initial viscosity is defined as the last measuring point at a low shear rate in the first measurement run and the final viscosity as the last measuring point at a low shear rate in the twelfth measurement run.

2.3. Determination of Shear Strength:

To determine the sintering capacity on aluminum and copper, the shear strengths of each sintering connection material were determined on aluminum and copper. For this purpose, the sintering pastes according to the invention and the comparative pastes were applied by means of stencil printing to an aluminum sheet of 5 mm thickness and to the 300 µm thick copper surface of a DCB substrate with a wet film thickness of 50 µm. Subsequently, the applied sintering pastes were pre-dried at 140° C. for 10 min and then contacted over the full area with a silicon chip having a silver contact surface (4 mm×4 mm). The subsequent pressure sintering was carried out under a nitrogen atmosphere (<100 ppm oxygen) in a hot press at 230° C. and 12 MPa for 5 minutes. For the purpose of determining the shear strength, the components were sheared off at 20° C. with a shear chisel at a speed of 0.3 mm/s. The force was recorded by means of a load cell (device: DAGE 2000 from DAGE, Germany).

TABLE 2

Evaluation of sintering pastes 1, 2 and 3 according to the invention and comparative pastes C1, C2 and C3 with regard to drying behavior, recovery rate directly after shear loading and shear strength on aluminum and copper surfaces

|  | 1 | 2 | 3 | C1 | C2 | C3 |
|---|---|---|---|---|---|---|
| Drying behavior | Very good, no drying channels visible | Very good, no drying channels visible | Good, individual, small drying channels visible | Poor, defects and large drying channels visible | Poor, many drying channels visible | Poor, many defects and drying channels visible |
| Initial viscosity (Pa · s) | 25.5 | 18.5 | 34.0 | 22.0 | 29.5 | 56.0 |
| Final viscosity (Pa · s) | 20.5 | 15.5 | 27.0 | 17.0 | 16.0 | 10.0 |
| Recovery rate (%) | 80.4 | 83.8 | 79.4 | 77.3 | 54.2 | 17.9 |
| Shear values on aluminum surface [N/mm$^2$] | ./. | 40 | 52 | 6 | 0 | 0 |
| Shear values on copper surface [N/mm$^2$] | 44 | 45 | 55 | 24 | 14 | 9 |

The invention claimed is:

1. A sintering paste consisting of:
   (A) 32 to 37 wt. % of silver flakes with an average particle size ranging from 1 to 20 µm;
   (B) 10 to 16 wt. % of silver particles with an average particle size ranging from 20 to 100 nm;
   (C) 32 to 40 wt. % of silver(I) oxide particles;
   (D) 12 to 20 wt. % of at least one organic solvent;
   (E) 0 to 1 wt. % of at least one polymer binder; and
   (F) 0 to 0.5 wt. % of at least one additive differing from constituents (A) to (E).

2. The sintering paste according claim 1, wherein the silver particles have an aspect ratio ranging from 1:1 to 5:1.

3. The sintering paste according to claim 1, wherein the silver(I) oxide particles have an average particle size ranging from 0.4 to 4 µm.

4. The sintering paste according to claim 1, wherein the at least one organic solvent is a combination of at least one terpineol with at least one dibasic ester.

5. The sintering paste according to claim 1, wherein the at least one polymer binder is selected from cellulose derivatives.

6. The sintering paste according to claim 1, wherein at least a portion of the silver particles is adhered to at least a portion of the silver flakes.

7. A method for producing the sintering paste according to claim 1, the method comprising mixing constituents (A) to (D) with one another, wherein constituents (A) and (B) are first premixed with one another.

8. A method for connecting components, the method comprising:
   (1) providing a sandwich arrangement, the sandwich arrangement comprising at least two components and a sintering paste according to claim 1 located between the components;
   (2) optionally drying the sintering paste; and
   (3) sintering the sandwich arrangement.

9. The method according to claim 8, wherein at least one of the at least two components consists of aluminum or an aluminum alloy.

10. The method according to claim 8, wherein the sintering paste is applied by means of dispensing technology.

11. The method according to claim 8, wherein sintering is carried out under pressure or in an unpressurized manner.

12. The method according to claim 8, wherein the components are component parts for electronics.

13. A method for connecting components, the method comprising:
   (1) providing a sandwich arrangement, the sandwich arrangement comprising at least two components and the sintering paste, the sintering paste produced by a method according to claim 7 and located between the components;

(2) optionally drying the sintering paste; and
(3) sintering the sandwich arrangement.

14. The method of claim 13, the method comprising drying the sintering paste.

15. The method of claim 8, the method comprising drying the sintering paste.

16. The method according to claim 8, wherein at least one of the at least two components comprises an aluminum contact surface or an aluminum-based contact surface by which the sandwich arrangement is made.

17. The method according to claim 7, wherein constituents (A) to (E) are mixed with one another.

18. The method according to claim 7, wherein constituents (A) to (F) are mixed with one another.

19. The sintering paste of claim 1, wherein at least one of the silver particles and the silver(I) oxide particles comprise an organic coating.

* * * * *